United States Patent
Harres et al.

(10) Patent No.: US 12,067,132 B2
(45) Date of Patent: Aug. 20, 2024

(54) JUST-IN-TIME DATA OBJECT PERMISSION RESTRICTION

(71) Applicant: Oracle International Corporation, Redwood Shores, CA (US)

(72) Inventors: John Michael Harres, Thornton, CO (US); Darren James Moffat, Lower Earley (GB); Mark Leroy Shellenbaum, Westminster, CO (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 17/561,469

(22) Filed: Dec. 23, 2021

(65) Prior Publication Data
US 2023/0205903 A1 Jun. 29, 2023

(51) Int. Cl.
*G06F 21/60* (2013.01)
*G06F 21/62* (2013.01)

(52) U.S. Cl.
CPC ........ *G06F 21/604* (2013.01); *G06F 21/6209* (2013.01); *G06F 2221/2125* (2013.01); *G06F 2221/2141* (2013.01)

(58) Field of Classification Search
CPC ........ G06F 21/60; G06F 21/604; G06F 21/62; G06F 21/6209; G06F 21/6218; G06F 2221/2125; G06F 2221/2141
See application file for complete search history.

(56) References Cited

U.S. PATENT DOCUMENTS

| | | | |
|---|---|---|---|
| 10,521,401 B2 | 12/2019 | Madaan et al. | |
| 11,170,102 B1 | 11/2021 | Bhattacharya et al. | |
| 2008/0306954 A1* | 12/2008 | Hornqvist | G06F 16/168 707/999.009 |
| 2013/0218999 A1 | 8/2013 | Martin | |
| 2014/0245461 A1* | 8/2014 | O'Neill | G06F 21/6245 726/28 |
| 2016/0359859 A1 | 12/2016 | Capone | |

(Continued)

OTHER PUBLICATIONS

Non-Final Office Action for U.S. Appl. No. 17/569,442, dated Apr. 4, 2024.

(Continued)

*Primary Examiner* — Boris D Grijalva Lobos
(74) *Attorney, Agent, or Firm* — Mughal Gaudry & Franklin PC

(57) ABSTRACT

Using a computer system, an instruction is received to define or modify a permission constraint corresponding to one or more files. A permission-instruction data set representing the permission constraint is stored in a data store. Subsequent to storing the permission-instruction data, a user request to access a particular file is intercepted. The data store is queried to determine whether any pending permission-instruction data set corresponds to the particular file. In response to the query, it is determined that the permission-instruction data set corresponds to the particular file. A permission constraint of the particular file is added or modified based on the permission-instruction data set. Based on the modified or added permission constraint, it is determined whether and/or an extent to which the user request is authorized. A response to the user request based on the determination as to whether and/or an extent to which the user request is authorized.

20 Claims, 6 Drawing Sheets

(56) References Cited

U.S. PATENT DOCUMENTS

| | | | |
|---|---|---|---|
| 2019/0114330 A1 | 4/2019 | Xu et al. | |
| 2020/0120098 A1* | 4/2020 | Berg | H04L 63/104 |
| 2020/0380155 A1 | 12/2020 | Sarferaz | |
| 2021/0097190 A1* | 4/2021 | Scrivano | H04L 63/104 |
| 2021/0209243 A1 | 7/2021 | Gallardo | |
| 2021/0397987 A1* | 12/2021 | Dixit | G06Q 10/063 |
| 2022/0052988 A1 | 2/2022 | Gadnis et al. | |
| 2022/0237148 A1 | 7/2022 | Perlman et al. | |
| 2023/0205899 A1* | 6/2023 | Harres | G06F 21/6218 |
| | | | 726/28 |
| 2023/0205903 A1* | 6/2023 | Harres | G06F 21/604 |
| | | | 726/26 |

OTHER PUBLICATIONS

Non-Final Office Action for U.S. Appl. No. 17/931,446, dated Jun. 21, 2024.

* cited by examiner

JUST-IN-TIME DATA OBJECT PERMISSION RESTRICTION

TECHNICAL FIELD OF THE INVENTION

This disclosure generally relates to systems and methods of controlling and implementing permission constraints that limit whether and/or how a user device may interact with a data file.

BACKGROUND

The continuous expansion of the Internet, along with the expansion and sophistication of computing networks and systems, has led to the proliferation of content being stored and accessible over the Internet. This, in turn, has driven the need for large and sophisticated data storage systems. As the demand for data storage continues to increase, larger and more sophisticated storage systems are being designed and deployed. Many large-scale data storage systems utilize storage appliances that include arrays of physical storage media. These storage appliances are capable of storing incredible amounts of data. Moreover, multiple storage appliances may be networked together to form a storage pool, which can further increase the volume of stored data.

Typically, large storage systems such as these may include a file system for storing and accessing files. Frequently, a backup storage scheme is also employed to ensure that important files are not lost if a file storage device fails. However, existence of backup files only amplifies the total size and complexity of the storage system.

The increase of the complexity of file systems is not limited to cloud-based, virtual and/or distributed systems. The storage capacity and processing power of individual user devices (e.g., desktop computers, laptops, mobile phones) have also dramatically increased over the past decade. Thus, applications are being developed and user habits are being shaped to store larger data files and more data files.

However, a drawback of the complex computing systems that can stored many data files is that searching the file system(s) of the computing system to find a given data file is then more difficult and can consume more resources and take more time.

In some instances, the file system may be designed based on a hierarchy that facilitates quickly locating a given file. For example, if a user navigates to a particular sub-folder in the "Documents" folder in a file system representation and then selects a file to open, the representation of the file and/or a stored hierarchy may be associated with one or more pointers that indicate a location of the file. However, if a user command or query specifies a file attribute, the computing system may need to process attributes of each stored file to detect any or all files that have the attribute.

Thus, it would be advantageous to more efficiently process instructions pertaining to one or more files stored in a file system.

BRIEF SUMMARY

In some embodiments, a computer-implemented method is provided. Using a computer system, an instruction is received to define or modify a permission constraint corresponding to one or more files. A permission-instruction data set representing the permission constraint is stored in a data store. Subsequent to storing the permission-instruction data, a user request to access a particular file is intercepted. The data store is queried to determine whether any pending permission-instruction data set corresponds to the particular file. In response to the query, it is determined that the permission-instruction data set corresponds to the particular file. A permission constraint of the particular file is added or modified based on the permission-instruction data set. Based on the modified or added permission constraint, it is determined whether and/or an extent to which the user request is authorized. A response to the user request based on the determination as to whether and/or an extent to which the user request is authorized.

An operating system may perform the intercepting the user request, the querying the data store, and the determining that the permission-instruction data set corresponds to the particular file.

Modifying or adding the permission constraint may include adding a permission constraint that disallows modification to content of the particular file and that disallows deleting the particular file, and the response to the user request may include a read-only version of the particular file.

The permission-instruction data set may identify a particular period of time during which the permission constraint is to be applied, and the method may further include upon determining that the permission-instruction data set corresponds to the particular file, determining that a current time is within the particular period of time.

The user request may have been received at the computer system from a user device, and the computer system may at least partly control a set of files that are remote from the user device, and wherein the set of files includes the particular file.

The modification or addition of the permission constraint may occur at least two weeks after the storage of the permission-instruction data.

The instruction may identify one or more file attributes and indicates that permission constraint is to apply to any file, within a set of files, that has the one or more file attributes, and determining that the permission-instruction data set corresponds to the particular file may include determining that the particular file has the one or more file attributes.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

BRIEF DESCRIPTION OF THE DRAWINGS

A further understanding of the nature and advantages of embodiments according to the present disclosure may be realized by reference to the remaining portions of the specification in conjunction with the following appended figures.

Figure 1:
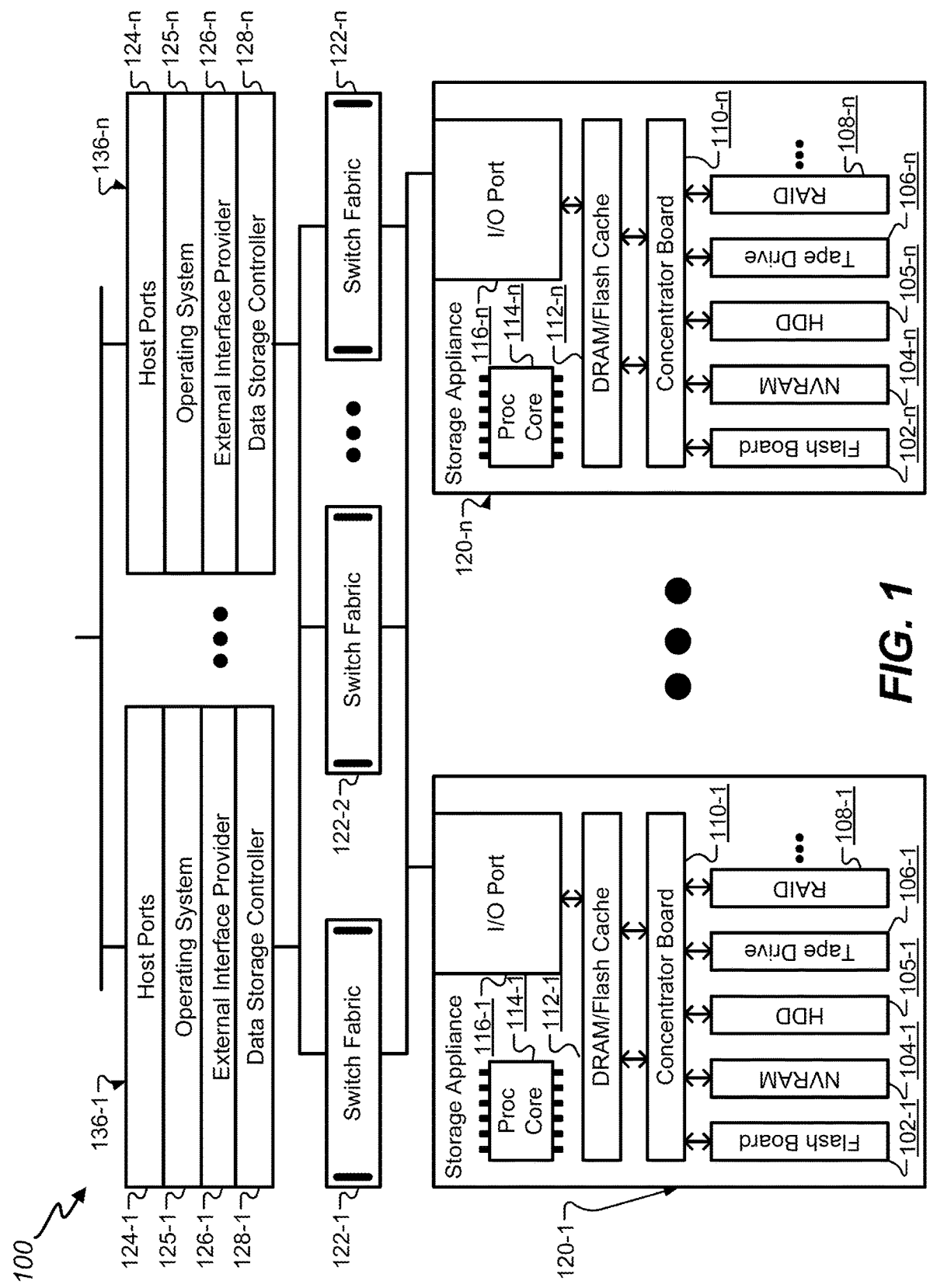
FIG. 1 illustrates one example storage network that may be used to implement certain embodiments according to the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Complex storage systems offer scale capabilities and may further be elastic. However, accessing any given file may be more resource-intensive in larger and/or more complex systems. Not only might this complexity result in a delay in processing a given request or instruction, but it may further impede processing another request or instruction due to consumption of limited resources. Therefore, it would be advantageous to efficiently process requests that pertain to files in a file system.

In some embodiments, systems or methods are provided for processing—at a computing system—an instruction (e.g., as included in a request from a user device, as identified in a communication from another computing system, or as generated by executing a rule using current or recent information) by storing data characterizing the instruction in a central data store (e.g., a local data store or a remote data store) and subsequently triggering implementing an action identified in the instruction. The processing of the instruction, storing data characterizing the instruction, triggering implementing the action identified in the instruction, and/or performing the action identified in the instruction may be performed by an operating system of the computing system and/or at a presentation layer of a communication model (e.g., Open Systems Interconnection, or OSI, model). For example, the operating system may include a filter or intercept driver to intercept a subsequent request to access (e.g., read, write to, add links to, move, copy, rename, delete, etc.) any of one or more files stored at the computing system.

The instruction may identify a single file, multiple files, and/or one or more file attributes (that may be associated with one or more files). The instruction may identify an action to be taken in relation to each identified file, each of the identified files, or each file associated with the one or more identified file attributes. The action may include (for example) defining or restricting a permission constraint associated with the file, such as a permission constraint to read, write to, rename, move, copy, or delete a file. Defining or restricting the permission constraint may (for example) include specifying that (for example):

no user device is to be permitted to perform the specified action;

one or more specified user devices are prohibited from performing the specified action;

only one or more specified user devices (e.g., being associated with a user profile having a given field value, such as "auditor" for a "role field; or any of a set of devices having any of a defined set of IP addresses) are permitted to perform the specified action, whereas all other user devices are prohibited from performing the specified action;

any user device with (any or all of) one or more specified attributes is prohibited from initiating (e.g., via an instruction or request communication for) the specified action;

the specified action is to only be performed when a corresponding instruction to perform the action is received from a user device having (any or all of) one or more specified attributes; or the specified action is not to be performed when a corresponding instruction to perform the action is received from a user device having (any or all of) one or more specified attributes.

An attribute of a user device may include an attribute, characteristic, or specification of the user device or of a profile of a user associated with the user device. The attribute may include an identifier indicating (for example) whether the user device is part of a particular network, a role assigned to the user device, a value corresponding to a field in a user profile, a range of values within which a value defined for the user device (or associated user profile) may (or may not) be within, etc.

Implementation of the instruction may include initiating the action to be performed on the file(s) at a triggered time. The triggered time may be later than a time at which the instruction(s) were identified and/or detected. The triggered time may be later than a time at which data characterizing the instruction is stored in a central data store. The triggered time may be defined based on and/or may be after a time at which a request is received from a user device, a request is received from another computing system, or the instant computing detects that a condition for triggering a given action is received.

For example, one or more rules can be defined based on (for example) a communication that includes rule-defining specifications received from a user device. The rule-defining specifications may identify a particular file, multiple particular files, one or more file attributes, etc. so as to indicate to which file(s) a given rule is to apply. The rule-defining specifications may include a specification of a permission constraint (e.g., indicating that a given action—such as deleting, modifying, renaming, adding links, copying, or reading—is to be prohibited). The rule-defining specifications may identify a circumstance (e.g., time window, temperature window, window of network congestion, etc.) during which the permission constraint is to be applied for the indicated file(s). Multiple rules may be defined that apply to different circumstances. An effect of the multiple rules may be (for example) that all actions are permitted for a given file during a first time window, the file cannot be deleted or modified during a second time window, and the file can be deleted but not modified during a third time window.

Continuing with the example, a computing system may determine that the communication that includes the rule-defining specification was received from a user device or was transmitted from a user account that is authorized to institute such a prevention of modification. However, rather than instantly locating the file and changing its permission constraints in accordance with the specification(s), the computing system (e.g., an operating system on the computing system or a component of the computing system operating at a presentation layer of a communications model) may store an indication that the permission constraint is to be effected during the corresponding circumstance. The computing system may be configured such that detecting any request to access or modify (e.g., write to, rename, delete, etc.) any of one, more or all files on a file system (e.g., a particular local or remote file system) triggers a process to determine whether the file of the request corresponds to any file that has a pending permission constraint that applies to a current circumstance (e.g., a pending permission constraint associated with a time window that includes a current time). If so, the file may be transformed to effect the pending permission constraint (e.g., by setting or changing an attribute or permission constraint of the file), and the request (to access or modify the file) can be subsequently evaluated.

As a first exemplary illustration of the example, the computing system (e.g., the operating system of the computing system) may detect a specific first request to access the file. The computing system may then query the file system to determine whether the file is associated with any pending permission constraint.

If the computing system (e.g., an operating system of the computing system or at a presentation layer of a communications model) detects (via processing a response from the storage sub-system) that a pending permission constraint (e.g., any pending permission constraint or any pending permission constraint that applies to the query) is associated with the file, the computing system may initiate and/or perform a process to implement the permission constraint for the file. Implementing the permission constraint may include (for example) setting or modifying an attribute, metadata value, or permission setting of the file and/or potentially one or more other files that pertain to the query. Implementing the permission constraint may include (for example) defining or refining a higher level rule or constraint that indicates when a file (e.g., a particular file, a file having a specific characteristic, or any file) is to be availed for a given type or use (e.g., read access, write access, delete access, copying access, renaming access, etc.).

A pending permission constraint may correspond to a permission constraint that is to be applied indefinitely, conditioned in terms of a duration for which it is to be applied, or to be applied for a only a specified period of time. For example, a read-access constraint (e.g., that applies to a specified user device, a specified set of user devices, any user device associated with one or more specified attributes, or all user devices) may be defined to be imposed indefinitely, or applicable for a specific period of time (e.g., as identified via input received at the user device), applicable until a condition is satisfied (e.g., where the condition is defined based on input received at the user device).

It will be appreciated that delaying initiation of the action in the instruction (e.g., delaying instituting a new permission constraint) until the triggered time may result in the action never being performed. For example, if a permission constraint is to be implemented for a particular file for a defined period of time (e.g., a month), and if—during that month—no request is received to access (e.g., read or write to) the file, the permission constraint may end up not being implemented at all.

By postponing initiating and/or postponing implementing a permission constraint beyond when a corresponding file is first requested for some type of access (e.g., read access, write access, delete access, renaming access, etc.), the computing system can be more efficient in multiple regards. In a conventional system, as soon as a permission constraint was identified and authorization for imposing such a constraint was verified, the computing system (e.g., an operating system of the computing system) may locate the file and change the permission(s), attribute(s), or metadata value(s) to reflect the new constraint. However, locating the file may be particularly time-consuming when the computing system is complex. The location effort may consume computational resources that may be used for other efforts, and/or the location effort may take so long as to be too slow to be in effect for a next subsequent applicable request. Thus, delaying implementing the permission constraint may improve the efficiency of the computing system and conserve resources. In some instances, implementing the permission constraint alongside processing a request for the file can result in one less instance of locating and retrieving the file. In some instances, conditioning implementing the permission constraint based on first receiving a request for the file may result in the permission constraint never being implemented at all (when no such request is received), as such implementation would not be needed.

FIG. 1 illustrates one example storage network 100 that may be used to implement certain embodiments according to the present disclosure. Storage network 100 may include a file system for which permissions of files are to be implemented and/or controlled in accordance with a technique disclosed herein.

The selection and/or arrangement of depicted in FIG. 1 are shown only by way of example, and are not meant to be limiting. FIG. 1 provides a plurality of storage appliances 120 connected through one or more switch circuits 122. The switch circuits 122 may connect the plurality of storage appliances 120 to a plurality of I/O servers 136, which in turn may provide access to the plurality of storage appliances 120 for client devices, such as local computer systems, computer systems available over a network, and/or cloud computing systems.

Each I/O server 136 may execute multiple independent file system instances, each of which may be responsible for the management of a portion of the overall storage capacity. These file system instances may include the Oracle ZFS file system. The I/O servers 136 may comprise blade and/or standalone servers that include host ports 124 to communicate with the client devices by receiving read and/or write data access requests.

Each I/O server 136 can include an operating system 125, which can include software operating at a system level (e.g., at a presentation level in a communications model, such as the OSI model) across the storage network 100 to manage (e.g., allocate) hardware and software resources. That is, the operating system 125 can be configured to be an interface between software applications and hardware, so as to (for example) process select software requests or instructions to determine whether they are permissible, how they are to be prioritized in terms of hardware access relative to other requests or instructions, etc. For example, operating system 125 can manage one or more queues to prioritize tasks. The operating system 125 can further use interrupts or intercepts to monitor an environment to detect particular types of events (e.g., requests to access a stored file, instructions to modify permissions of a file, etc.). The host ports 124 may communicate with an external interface provider 126 that identifies a correct data storage controller 128 to service each I/O request that is approved for processing via operating system 125.

As a specific example, the operating system 125 can detect an instruction to perform one or more specific permission-modifying actions for any of one or more files. The one or more specific permission-modifying actions may include instituting a restriction as to which devices or users are authorized to read, write to, delete, add links to or rename one or more files, or the one or more specific-modifying actions may prevent reading, writing to, deleting, add links to or renaming one or more files. Each permission-modifying action may be defined such that the restriction is to apply for a specified period of time, until a condition is satisfied, or indefinitely.

Upon detecting such an instruction, the operating system 125 may initiate storing a representation of the instruction. The operating system 125 may further institute an intercept process to intercept any request pertaining to a file request (or a file request of a particular type). For example, the intercept may be configured to intercept any write request, any read request, etc. or to intercept any request that would require retrieving the file.

Retrieving, modifying, implementing a new permission constraint for, or changing a permission constraint for a file can include interacting the data storage controller 128 or initiating performance of such an action by the data storage controller 128.

The data storage controllers 128 can each exclusively manage a portion of data content in one or more of the storage appliances 120 described below. Thus, when a data request from an external interface provider 126 is set (e.g., in queue) to be processed, each data storage controller 128 can access a logical portion of the storage pool and satisfy the data request.

Redirection through the data storage controllers 128 may include redirection of each I/O request from the host ports 124 to a file system instance (e.g., a ZFS instance) executing on the I/O servers 136 and responsible for the blocks requested. For example, this may include a redirection from a host port 124-1 on one I/O server 136-1 to a ZFS instance on another I/O server 136-n. This redirection may allow any part of the available storage capacity to be reached from any host port 124. The ZFS instance may then issue the necessary direct I/O transactions to any storage device in the storage pool to complete the request. Acknowledgements and/or data may then be forwarded back to the client device through the originating host port 124.

A low-latency, memory-mapped network may tie together the host ports 124, any file system instances, and the storage appliances 120. This network may be implemented using one or more switch circuits 122, such as Oracle's Sun Data Center InfiniBand Switch 36 to provide a scalable, high-performance cluster. A bus protocol, such as the PCI Express bus, may route signals within the storage network. The I/O servers 136 and the storage appliances 120 may communicate as peers. The redirection traffic and ZFS memory traffic may both use the same switch fabric.

In various embodiments, many different configurations of the storage appliances 120 may be used in the network of FIG. 1. In some embodiments, the Oracle ZFS Storage Appliance series may be used. The ZFS Storage Appliance provides storage based on the Oracle Solaris kernel with Oracle's ZFS file system ("ZFS") described below. The processing core 114 handles any operations required to implement any selected data protection (e.g., mirroring, RAID-Z, etc.), data reduction (e.g., inline compression, duplication, etc.), and any other implemented data services (e.g., remote replication, etc.). In some embodiments, the processing core may comprise an 8×15 core of 2.8 GHz Intel® Xeon® processors. The processing core also handles the caching of stored data in both DRAM and Flash 112. In some embodiments, the DRAM/Flash cache may comprise a 3 TB DRAM cache. The processing core 114 can further handle operations defined by, initiated, or controlled by the operating system 125.

In some configurations, the storage appliances 120 may comprise an I/O port 116 to receive I/O requests from the data storage controllers 128. Each of the storage appliances 120 may include an integral rack-mounted unit with its own internally redundant power supply and cooling system. A concentrator board 110 or other similar hardware device may be used to interconnect a plurality of storage devices. Active components such as memory boards, concentrator boards 110, power supplies, and cooling devices may be hot swappable. For example, the storage appliance 120 may include flash memory 102, nonvolatile RAM (NVRAM) 104, various configurations of hard disk drives 105, tape drives, RAID arrays 108 of disk drives, and so forth. These storage units may be designed for high availability with hot swapping and internal redundancy of memory cards, power, cooling, and interconnect. In some embodiments the RAM may be made non-volatile by backing it up to dedicated Flash on loss of power. The mix of Flash and NVRAM cards may be configurable, and both may use the same connector and board profile.

Although not shown explicitly, each of the I/O servers 136 may execute and/or operating system 125 may include a global management process or data storage system manager, that may supervise the operation of the storage system in a pseudo-static, "low touch" approach, intervening when capacity must be reallocated between ZFS instances, for global Flash wear leveling, for configuration changes, to modify and/or enforce files' permission constraints, and/or for failure recovery. The "divide and conquer" strategy of dividing the capacity among individual ZFS instances may enable a high degree of scalability of performance, connectivity, and capacity. Additional performance may be achieved by horizontally adding more I/O servers 136, and then assigning less capacity per ZFS instance and/or fewer ZFS instances per I/O server 136. Performance may also be scaled vertically by using faster servers. Additional host ports may be included by filling available slots in the I/O servers 136 and then adding additional servers. Additional capacity may also be achieved by adding additional storage appliances 120, and allocating the new capacity to new or existing ZFS instances.

Figure 2:
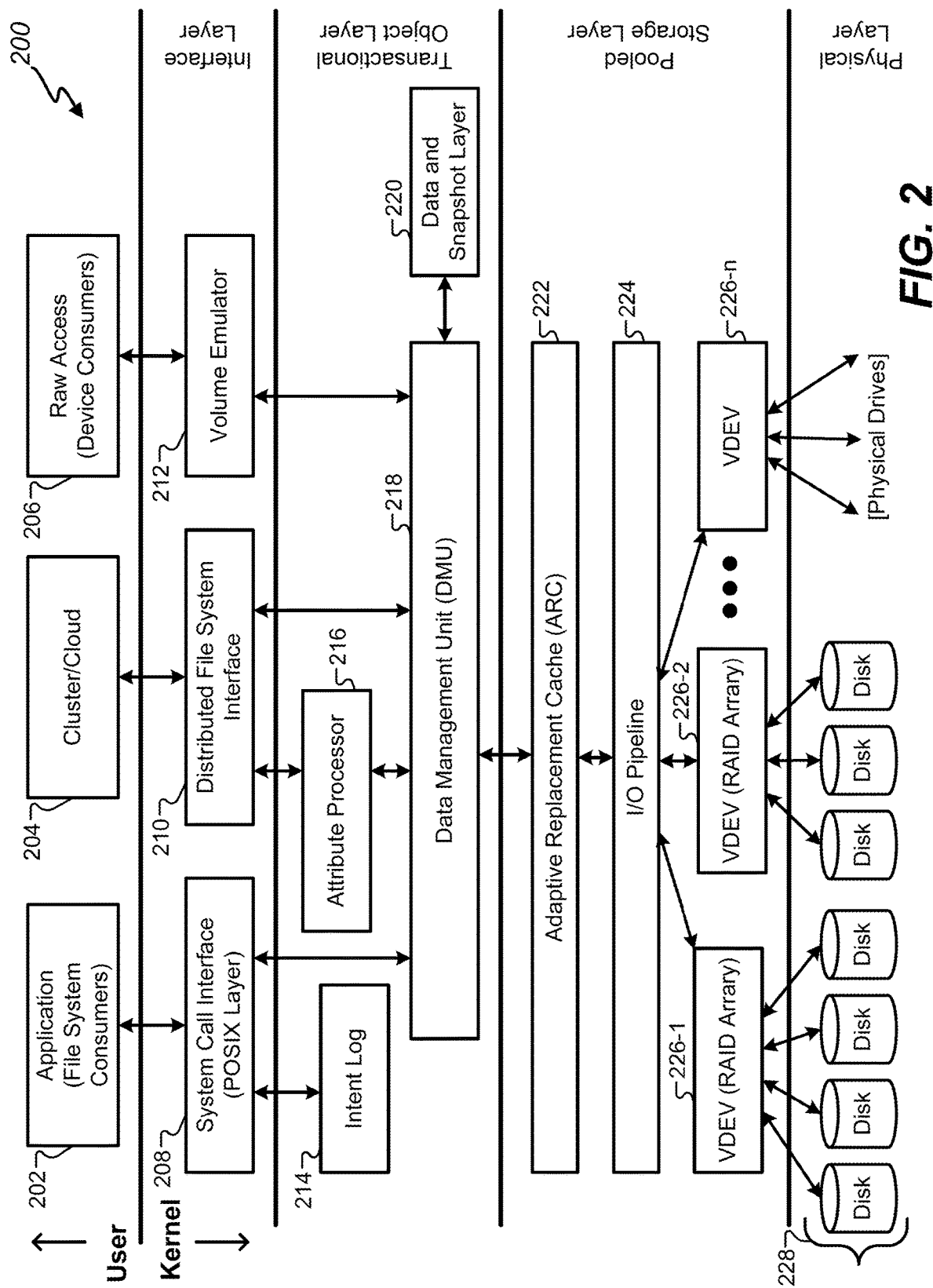
FIG. 2 illustrates an instance of an example network file system that may be executed in a storage environment.

FIG. 2 illustrates an instance of an example network file system 200 that may be executed in a storage environment, such as the storage environment of FIG. 1, in accordance with certain embodiments of the present disclosure. For example, the file system 200 may include the Oracle ZFS file system ("ZFS"), which provides very large capacity (128-bit), data integrity, an always-consistent, on-disk format, self-optimizing performance, and real-time remote replication. Among other ways, ZFS departs from traditional file systems at least by eliminating the need for a separate volume manager. Instead, a ZFS file system shares a common storage pool of storage devices and acts as both the volume manager and the file system. Therefore, ZFS has complete knowledge of both the physical disks and volumes (including their condition, status, and logical arrangement into volumes, along with all the files stored on them). Devices can be added or removed from the pool as file system capacity requirements change over time to dynamically grow and shrink as needed without needing to repartition the underlying storage pool.

The system 200 may include one or more components operating in a user-interfacing layer, one or more components operating in an interface layer, one or more components operating in a transactional object layer, one or more components operating in a pooled storage layer, and/or one or more components operating in a physical layer.

A user interacts with an application 202 through an operating system (e.g., operating system 125). The operating system may include functionality to interact with a file system (e.g., to add, modify, remove, and/or implement one or more permission constraints for one or more files), which in turn interfaces with a storage pool. The operating system typically interfaces with the file system 200 via a system call interface 208. However, it will be appreciated that the operating system may further or alternatively interface with each of one or more components of the interface layer and/or each of one or more components of one or more other layers.

The system call interface 208 provides traditional file read, write, open, close, etc., operations, as well as VNODE operations and VFS operations that are specific to the VFS architecture. The system call interface 208 may act as a primary interface for interacting with the ZFS as a file system. Thus, the system call interface 208 can further intercept any call to read, write, open, close, rename, etc., a file to determine whether a stored instruction to modify a permission constraint pertains to the file. This layer resides between a data management unit (DMU) 218 and presents a file system abstraction of the files and directories stored therein. The system call interface 208 may be responsible for bridging the gap between the file system interfaces and the underlying DMU 218 interfaces.

In addition to the POSIX layer of the system call interface 208, the interface layer of the file system 200 may also provide a distributed file system interface 210 for interacting with cluster/cloud computing devices 204. For example, a Lustre® interface may be provided to provide a file system for computer clusters ranging in size from small workgroup clusters to large-scale, multi-site clusters. A volume emulator 212 may also provide a mechanism for creating logical volumes which can be used as block/character devices. The volume emulator 212 not only allows a client system to distinguish between blocks and characters, but also allows the client system to specify the desired block size and thereby create smaller, sparse volumes in a process known as "thin provisioning." The volume emulator 212 provides raw access 206 to external devices.

Underneath the interface layer lies a transactional object layer. This layer provides an intent log 214 configured to record a per-dataset transactional history which can be replayed upon a system crash. In ZFS, the intent log 214 saves transaction records of system calls that change the file system in memory with sufficient information to be able to replay the system calls. These are stored in memory until the DMU 218 commits them to the storage pool and they can be discarded or they are flushed. In the event of a power failure and/or disk failure, the intent log 214 transactions can be replayed to keep the storage pool up-to-date and consistent.

The transactional object layer also provides an attribute processor 216 that may be used to implement directories within the POSIX layer of the system call interface 208 by making arbitrary {key, value} associations within an object. The attribute processor 216 may include a module that sits on top of the DMU 218 and may operate on objects referred to in the ZFS as "ZAP objects." ZAP objects may be used to store properties for a dataset, navigate file system objects, and/or store storage pool properties. ZAP objects may come in two forms: "microzap" objects and "fatzap" objects. Microzap objects may be a lightweight version of the fatzap objects and may provide a simple and fast lookup mechanism for a small number of attribute entries. Fatzap objects may be better suited for ZAP objects containing large numbers of attributes, such as larger directories, longer keys, longer values, etc.

The transactional object layer also provides a data set and snapshot layer 220 that aggregates DMU objects in a hierarchical namespace, and provides a mechanism for describing and managing relationships between properties of object sets. This allows for the inheritance of properties, as well as quota and reservation enforcement in the storage pool. DMU objects may include ZFS file system objects, clone objects, CFS volume objects, and snapshot objects. The data and snapshot layer 220 can therefore manage snapshot and clones. A snapshot is a read-only copy of a file system or volume. A snapshot is a view of a filesystem as it was at a particular point in time. A clone is a writable volume or file system whose initial contents are the same as the dataset from which it was created. In the ZFS system clones are always created from snapshots. As with snapshots, creating a clone is nearly instantaneous and initially consumes no additional disk space.

The DMU 218 presents a transactional object model built on top of a flat address space presented by the storage pool. The modules described above interact with the DMU 218 via object sets, objects, and transactions, where objects are pieces of storage from the storage pool, such as a collection of data blocks. Each transaction through the DMU 218 comprises a series of operations that are committed to the storage pool as a group. This is the mechanism whereby on-disk consistency is maintained within the file system. Stated another way, the DMU 218 takes instructions from the interface layer and translates those into transaction batches. Rather than requesting data blocks and sending single read/write requests, the DMU 218 can combine these into batches of object-based transactions that can be optimized before any disk activity occurs. Once this is done, the batches of transactions are handed off to the storage pool layer to schedule and aggregate the raw I/O transactions required to retrieve/write the requested data blocks. These transactions are written on a copy-on-write (COW) basis, which eliminates the need for transaction journaling.

The storage pool layer, or simply the "storage pool," may be referred to as a storage pool allocator (SPA). The SPA provides public interfaces to manipulate storage pool configuration. These interfaces can create, destroy, import, export, and pool various storage media and manage the namespace of the storage pool. In some embodiments, the SPA may include an adaptive replacement cache (ARC) 222 that acts as a central point for memory management for the SPA. Traditionally, an ARC provides a basic least-recently-used (LRU) object replacement algorithm for cache management. In ZFS, the ARC 222 comprises a self-tuning cache that can adjust based on the I/O workload. Additionally, the ARC 222 defines a data virtual address (DVA) that is used by the DMU 218. In some embodiments, the ARC 222 has the ability to evict memory buffers from the cache as a result of memory pressure to maintain a high throughput.

The SPA may also include an I/O pipeline 224, or "I/O manager," that translates the DVAs from the ARC 222 into logical locations in each of the virtual devices (VDEVs) 226 described below. The I/O pipeline 224 drives the dynamic striping, compression, checksum capabilities, and data redundancy across the active VDEVs. Although not shown explicitly in FIG. 2, the I/O pipeline 224 may include other modules that may be used by the SPA to read data from and/or write data to the storage pool. For example, the I/O pipeline 224 may include, without limitation, a compression module, an encryption module, a checksum module, and a metaslab allocator. The checksum may be used, for example, to ensure data has not been corrupted. In some embodiments, the SPA may use the metaslab allocator to manage the allocation of storage space in the storage pool.

Compression is the process of reducing the data size of a data block (referred to interchangeably with leaf node or data node), typically by exploiting redundancies in the data block itself. Many different compression types are used by ZFS. When compression is enabled, less storage can be allocated for each data block. The following compression algorithms are available. LZ4—an algorithm added after feature flags were created. It is significantly superior to LZJB. LZJB is the original default compression algorithm) for ZFS. It was created to satisfy the desire for a compression algorithm suitable for use in filesystems. Specifically, that it provides fair compression, has a high compression speed, has a high decompression speed and detects incompressible data detection quickly. GZIP (1 through 9 implemented in the classic Lempel-Ziv implementation. It provides high compression, but it often makes IO CPU-bound. ZLE (Zero Length Encoding)—a very simple algorithm that only compresses zeroes. In each of these cases there is a trade-off of compression ratio to the amount of latency involved in compressing and decompressing the data block. Typically—the more compressed the data—the longer it takes to compress and decompress it.

Encryption is the process of adding end-to-end security to data blocks by encoding them cryptographically with a key. Only users with a key can decrypt the data block. As used in the ZFS system, a ZFS pool can support a mix of encrypted and unencrypted ZFS data sets (file systems and ZVOLs). Data encryption is completely transparent to applications and provides a very flexible system for securing data at rest, and it doesn't require any application changes or qualification. Furthermore, ZFS encryption randomly generates a local encryption key from a passphrase or an AES key and all keys are stored locally with the client—not in the cloud object store 404 as traditional file systems do. Encryption is transparent to the application and storage to the cloud object store 404 when turned on. ZFS makes it easy to encrypt data and manage data encryption. You can have both encrypted and unencrypted file systems in the same storage pool. You can also use different encryption keys for different systems, and you can manage encryption either locally or remotely—although the randomly generated encryption key always remains local. ZFS encryption is inheritable to descendent file systems. Data is encrypted using AES (Advanced Encryption Standard) with key lengths of 128, 192, and 256 in the CCM and GCM operation modes.

Deduplication is the process of recognizing that a data block to be stored in the file system is already stored on the file system as an existing data block and pointing to that existing data block rather than storing the data block again. ZFS provides block-level deduplication because this is the finest granularity that makes sense for a general-purpose storage system. Block-level dedup also maps naturally to ZFS's 256-bit block checksums, which provide unique block signatures for all blocks in a storage pool as long as the checksum function is cryptographically strong (e.g. SHA256). Deduplication is synchronous and is performed as data blocks are sent to the cloud object store 404. If data blocks are not duplicated, enabling deduplication will add overhead without providing any benefit. If there are duplicate data blocks, enabling deduplication will both save space and increase performance. The space savings are obvious; the performance improvement is due to the elimination of storage writes when storing duplicate data, plus the reduced memory footprint due to many applications sharing the same pages of memory. Most storage environments contain a mix of data that is mostly unique and data that is mostly replicated. ZFS deduplication is per-dataset and can be enabled when it is likely to help.

In ZFS, the storage pools may be made up of a collection of VDEVs. In certain embodiments, at least a portion of the storage pools may be represented as a self-described Merkle tree, a logical tree where both data and metadata are stored by VDEVs of the logical tree. There are two types of virtual devices: physical virtual devices called leaf VDEVs, and logical virtual devices called interior VDEVs. A physical VDEV may include a writeable media block device, such as a hard disk or Flash drive. A logical VDEV is a conceptual grouping of physical VDEVs. VDEVs can be arranged in a tree with physical VDEVs existing as leaves of the tree.

The storage pool may have a special logical VDEV called a "root VDEV" which roots the tree. All direct children of the root VDEV (physical or logical) are called "top-level" VDEVs. In general, VDEVs implement data replication, mirroring, and architectures such as RAID-Z and RAID-Z2. Each leaf VDEV represents one or more physical storage devices 228 that actually store the data provided by the file system.

In some embodiments, the file system 200 may include an object-based file system where both data and metadata are stored as objects. More specifically, the file system 200 may include functionality to store both data and corresponding metadata in the storage pool. A request to perform a particular operation (i.e., a transaction) is forwarded from the operating system, via the system call interface 208, to the DMU 218, which translates the request to perform an operation on an object directly to a request to perform a read or write operation (i.e., an I/O request) at a physical location within the storage pool. The SPA receives the request from the DMU 218 and writes the blocks into the storage pool using a COW procedure. COW transactions may be performed for a data write request to a file. Instead of overwriting existing blocks on a write operation, write requests cause new segments to be allocated for the modified data. Thus, retrieved data blocks and corresponding metadata are never overwritten until a modified version of the data block and metadata are committed. Thus, the DMU 218 writes all the modified data blocks to unused segments within the storage pool and subsequently writes corresponding block pointers to unused segments within the storage pool. To complete a COW transaction, the SPA issues an I/O request to reference the modified data block.

While FIG. 2 shows component within a customized protocol stack, other embodiments are contemplated. For example, a traditional OSI model includes an application layer, presentation layer, session layer, transport layer, network layer, data link layer, and physical layer (e.g., in this order from a top layer to a bottom layer). An operating system (e.g., operating system 125, which may control when and/or whether permission constraints are imposed and/or implemented) may interface with file system 200 via the network layer and/or transport layer. In some instances, an operating system may further or alternatively interface with file system 200 via the data link layer (e.g., by controlling virtual switches and tunnels) and/or the physical layer (e.g., by controlling virtual links between internal switching elements and/or physical adapters).

Figure 3:
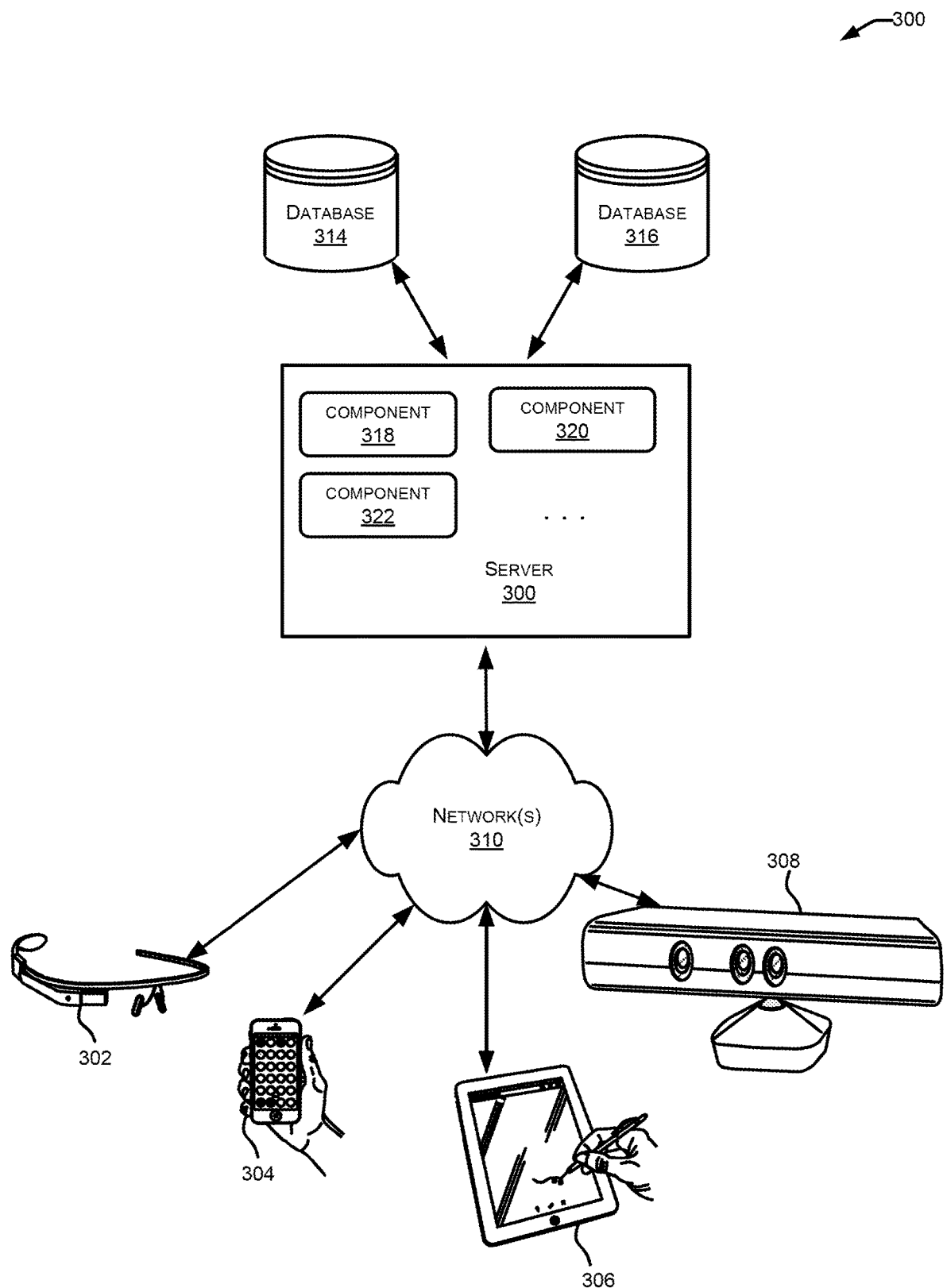
FIG. 3 depicts a simplified diagram of a distributed system for implementing certain embodiments in accordance with present disclosure.

FIG. 3 depicts a simplified diagram of a distributed system 300 for implementing certain embodiments in accordance with present disclosure. One or more components of distributed system 300 may include a file system for which permission constraints of files are to be implemented and/or controlled in accordance with a technique disclosed herein; may include instructions specifying when and how permission constraints of files are to be implemented and/or controlled; and/or may include one or more processors to execute instructions specifying when and how permission constraints of files are to be implemented and/or controlled.

In the illustrated embodiment, distributed system 300 includes one or more client computing devices 302, 304, 306, and 308, which are configured to execute and operate a client application such as a web browser, proprietary client (e.g., Oracle Forms), or the like over one or more network(s) 310. Server 312 may be communicatively coupled with remote client computing devices 302, 304, 306, and 308 via network 310.

Any of computing devices 302, 304, 306, and 308 and/or server 312 may perform part or all of a process disclosed herein. For example, any of 302, 304, 306, and 308 and/or server 312 may receive instructions to implement a permission constraint for one or more files, may store the instructions (or a representation thereof) in a data store, may—in response to receiving a request for a given file—query the data store to determine whether any pending instruction relates to the given file, and/or may—when a query result indicates that a pending instruction relates to the given file—implement a permission constraint for a requested file before determining whether to grant the request for the given file.

In various embodiments, server 312 may be adapted to run one or more services or software applications provided by one or more of the components of the system. In some embodiments, these services may be offered as web-based or cloud services or under a Software as a Service (SaaS) model to the users of client computing devices 302, 304, 306, and/or 308. Users operating client computing devices 302, 304, 306, and/or 308 may in turn utilize one or more client applications to interact with server 312 to utilize the services provided by these components.

In the configuration depicted in the figure, the software components 318, 320 and 322 of system 300 are shown as being implemented on server 312. In other embodiments, one or more of the components of system 300 and/or the services provided by these components may also be implemented by one or more of the client computing devices 302, 304, 306, and/or 308. While not explicitly shown, server 312 may further include an operating system that may perform part or all of one or more processes disclosed herein.

An operating system run by server 312 may include (for example) a version of Microsoft Windows®, Apple Macintosh®, a Linux operating system, a UNIX® operating system, or a UNIX-like operating system (e.g., a GNU/Linux operating system, such as Google Chrome OS).

Users operating the client computing devices may utilize one or more client applications to use the services provided by these components. These components may be implemented in hardware, firmware, software, or combinations thereof. It should be appreciated that various different system configurations are possible, which may be different from distributed system 300. The embodiment shown in the figure is thus one example of a distributed system for implementing an embodiment system and is not intended to be limiting.

Client computing devices 302, 304, 306, and/or 308 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers (e.g., personal computers and/or laptop computers), a thin-client computer, an Internet-enabled gaming system, a personal messaging device capable of communicating over network(s) 310, or a workstation.

An operating system run by a client computing device 302, 304, 306, and/or 308 may include (for example) a version of Microsoft Windows®, Apple Macintosh®, a Linux operating system, a UNIX® operating system, or a UNIX-like operating system (e.g., a GNU/Linux operating system, such as Google Chrome OS). An operating system running on a client computing device 302, 304, 306, and/or 308 may be configured to control permission constraints that correspond to one or more files stored locally on the client computing device. For example, a user (e.g., an administrator user or a user associated with account properties authorizing permission control) may provide an instruction (e.g., using an input component of the device, such as a keyboard, mouse, track pad, etc.) that indicates that a particular permission constraint is to be imposed for each of one or more particular files and/or for any file having one or more specified attributes. The operating system may locally store the instruction (or a representation thereof). Upon subsequently receiving a request for a file (e.g., from the user or from another user—as estimated based on which user account is being used), the operating system may determine whether any stored instruction applies to the file being requested and—if so—may implement a permission constraint before determining whether and/or how the file is authorized to be availed in response to the request.

Although exemplary distributed system 300 is shown with four client computing devices, any number of client computing devices may be supported. Other devices, such as devices with sensors, etc., may interact with server 312.

Network(s) 310 in distributed system 300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 310 can be a local area network (LAN), such as one based on Ethernet, Token-Ring and/or the like. Network(s) 310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 312 may be adapted to run one or more services or software applications described in the present disclosure. For example, server 312 may correspond to a server for performing processing described above according to an embodiment of the present disclosure.

Server 312 may run an operating system including any of those discussed above, as well as any commercially available server operating system. Server 312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 312 may include one or more applications to analyze and consolidate data feeds and/or event updates received from users of client computing devices 302, 304, 306, and 308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 312 may also include one or more applications to display the data feeds and/or real-time events via one or more display devices of client computing devices 302, 304, 306, and 308.

Distributed system 300 may also include one or more databases 314 and 316. Databases 314 and 316 may reside in a variety of locations. By way of example, one or more of databases 314 and 316 may reside on a non-transitory storage medium local to (and/or resident in) server 312. Alternatively, databases 314 and 316 may be remote from server 312 and in communication with server 312 via a network-based or dedicated connection. In one set of embodiments, databases 314 and 316 may reside in a storage-area network (SAN). Similarly, any necessary files for performing the functions attributed to server 312 may be stored locally on server 312 and/or remotely, as appropriate. In one set of embodiments, databases 314 and 316 may include relational databases, such as databases provided by Oracle, that are adapted to store, update, and retrieve data in response to SQL-formatted commands.

Database 314 and/or database 316 can include records and.or files for which permission constraints are implemented and/or evaluated in accordance to one or more techniques disclosed herein.

Figure 4:
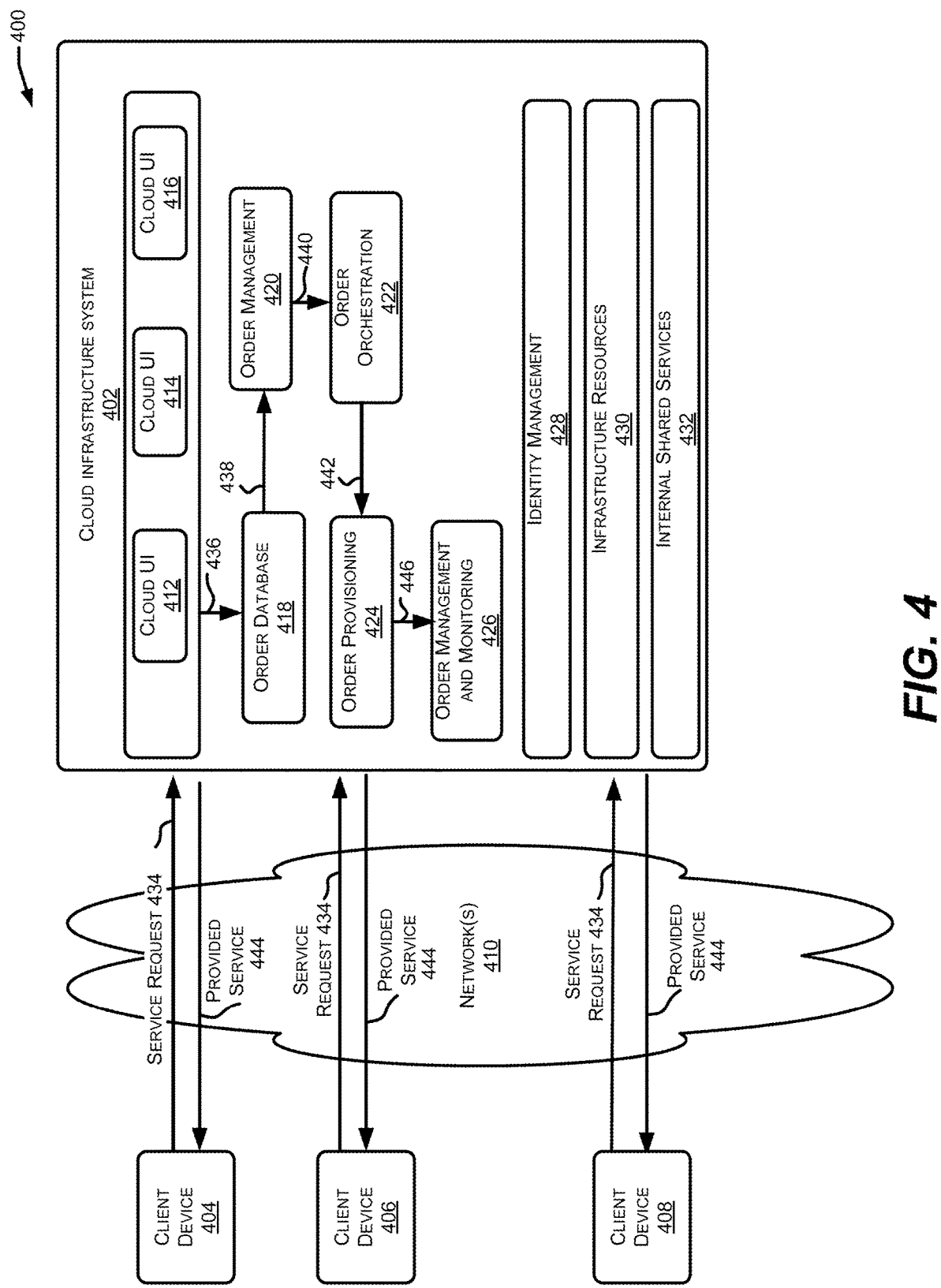
FIG. 4 is a simplified block diagram of one or more components of a system environment by which services provided by one or more components of a system may be offered as cloud services, in accordance with certain embodiments of the present disclosure.

FIG. 4 is a simplified block diagram of one or more components of a system environment 400 by which services provided by one or more components of a system may be offered as cloud services, in accordance with certain embodiments of the present disclosure. In the illustrated embodiment, system environment 400 includes one or more client computing devices 404, 406, and 408 that may be used by users to interact with a cloud infrastructure system 402 that provides cloud services. The client computing devices may be configured to operate a client application such as a web browser, a proprietary client application (e.g., Oracle Forms), or some other application, which may be used by a user of the client computing device to interact with cloud infrastructure system 402 to use services provided by cloud infrastructure system 402.

It should be appreciated that cloud infrastructure system 402 depicted in the figure may have other components than those depicted. Further, the embodiment shown in the figure is only one example of a cloud infrastructure system that may incorporate an embodiment of the invention. In some other embodiments, cloud infrastructure system 402 may have more or fewer components than shown in the figure, may combine two or more components, or may have a different configuration or arrangement of components.

Client computing devices 404, 406, and 408 may be devices similar to those described above for 302, 304, 306, and 308. Although exemplary system environment 400 is shown with three client computing devices, any number of client computing devices may be supported. Other devices such as devices with sensors, etc. may interact with cloud infrastructure system 402.

Network(s) 410 may facilitate communications and exchange of data between clients 404, 406, and 408 and cloud infrastructure system 402. Each network may be any type of network familiar to those skilled in the art that can support data communications using any of a variety of commercially-available protocols, including those described above for network(s) 310. Cloud infrastructure system 402 may comprise one or more computers and/or servers that may include those described above for server 312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 402 may be adapted to automatically provision, manage and track a customer's subscription to services offered by cloud infrastructure system 402. Cloud infrastructure system 402 may provide the cloud services via different deployment models. For example, services may be provided under a public cloud model in which cloud infrastructure system 402 is owned by an organization selling cloud services (e.g., owned by Oracle) and the services are made available to the general public or different industry enterprises. As another example, services may be provided under a private cloud model in which cloud infrastructure system 402 is operated solely for a single organization and may provide services for one or more entities within the organization. The cloud services may also be provided under a community cloud model in which cloud infrastructure system 402 and the services provided by cloud infrastructure system 402 are shared by several organizations in a related community. The cloud services may also be provided under a hybrid cloud model, which is a combination of two or more different models.

In some embodiments, the services provided by cloud infrastructure system 402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 402. Cloud infrastructure system 402 then performs processing to provide the services in the customer's subscription order.

In some embodiments, the services provided by cloud infrastructure system 402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 402 may also include infrastructure resources 430 for providing the resources used to provide various services to customers of the cloud infrastructure system. In one embodiment, infrastructure resources 430 may include pre-integrated and optimized combinations of hardware, such as servers, storage, and networking resources to execute the services provided by the PaaS platform and the SaaS platform. In some embodiments, resources in cloud infrastructure system 402 may be shared by multiple users and dynamically re-allocated per demand. Additionally, resources may be allocated to users in different time zones. For example, cloud infrastructure system 430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 432 may be provided that are shared by different components or modules of cloud infrastructure system 402 and by the services provided by cloud infrastructure system 402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 402, and the like.

In certain embodiments, as depicted in the figure, cloud management functionality may be provided by one or more modules, such as an order management module 420, an order orchestration module 422, an order provisioning module 424, an order management and monitoring module 426, and an identity management module 428. These modules may include or be provided using one or more computers and/or servers, which may be general purpose computers, specialized server computers, server farms, server clusters, or any other appropriate arrangement and/or combination.

In exemplary operation 434, a customer using a client device, such as client device 404, 406 or 408, may interact with cloud infrastructure system 402 by requesting one or more services provided by cloud infrastructure system 402 and placing an order for a subscription for one or more services offered by cloud infrastructure system 402. In certain embodiments, the customer may access a cloud User Interface (UI), cloud UI 412, cloud UI 414 and/or cloud UI 416 and place a subscription order via these UIs. The order information received by cloud infrastructure system 402 in response to the customer placing an order may include information identifying the customer and one or more services offered by the cloud infrastructure system 402 that the customer intends to subscribe to.

After an order has been placed by the customer, the order information is received via the cloud UIs, 412, 414 and/or 416. At operation 436, the order is stored in order database 418. Order database 418 can be one of several databases operated by cloud infrastructure system 418 and operated in conjunction with other system elements. At operation 438, the order information is forwarded to an order management module 420. In some instances, order management module 420 may be configured to perform billing and accounting functions related to the order, such as verifying the order, and upon verification, booking the order.

At operation 440, information regarding the order is communicated to an order orchestration module 422. Order orchestration module 422 may utilize the order information to orchestrate the provisioning of services and resources for the order placed by the customer. In some instances, order orchestration module 422 may orchestrate the provisioning of resources to support the subscribed services using the services of order provisioning module 424.

In certain embodiments, order orchestration module 422 enables the management of business processes associated with each order and applies business logic to determine whether an order should proceed to provisioning. At operation 442, upon receiving an order for a new subscription, order orchestration module 422 sends a request to order provisioning module 424 to allocate resources and configure those resources needed to fulfill the subscription order. Order provisioning module 424 enables the allocation of resources for the services ordered by the customer. Order provisioning module 424 provides a level of abstraction between the cloud services provided by cloud infrastructure system 400 and the physical implementation layer that is used to provision the resources for providing the requested services. Order orchestration module 422 may thus be isolated from implementation details, such as whether or not services and resources are actually provisioned on the fly or pre-provisioned and only allocated/assigned upon request.

At operation 444, once the services and resources are provisioned, a notification of the provided service may be sent to customers on client devices 404, 406, and/or 408 by order provisioning module 424 of cloud infrastructure system 402. At operation 446, the customer's subscription order may be managed and tracked by an order management and monitoring module 426. In some instances, order management and monitoring module 426 may be configured to collect usage statistics for the services in the subscription order, such as the amount of storage used, the amount data transferred, the number of users, and the amount of system up time and system down time.

In certain embodiments, cloud infrastructure system 400 may include an identity management module 428. Identity management module 428 may be configured to provide identity services, such as access management and authorization services in cloud infrastructure system 400. In some embodiments, identity management module 428 may control information about customers who wish to utilize the services provided by cloud infrastructure system 402. Such information can include information that authenticates the identities of such customers and information that describes which actions those customers are authorized to perform relative to various system resources (e.g., files, directories, applications, communication ports, memory segments, etc.). Identity management module 428 may also include the management of descriptive information about each customer and about how and by whom that descriptive information can be accessed and modified.

Figure 5:
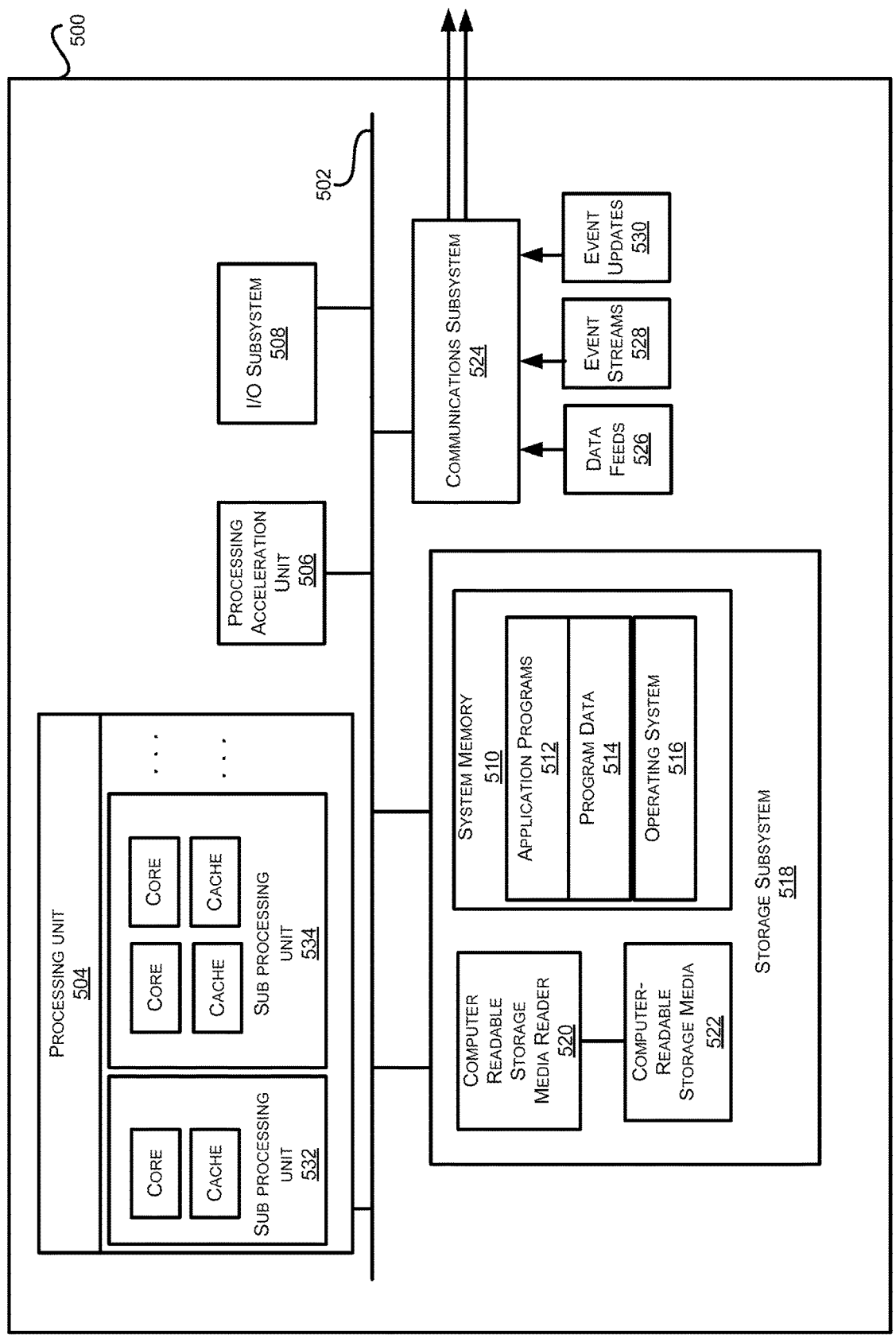
FIG. 5 illustrates an exemplary computer system, in which various embodiments of the present invention may be implemented.

FIG. 5 illustrates an exemplary computer system 500, in which various embodiments of the present invention may be implemented. The system 500 may be used to implement any of the computer systems described herein. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like. In some embodiments, the processing acceleration unit 506 may include or work in conjunction with an acceleration engine such as that disclosed herein to improve computer system functioning.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that comprises software elements, shown as being currently located within a system memory 510. System memory 510 may store program instructions that are loadable and executable on processing unit 504, as well as data generated during the execution of these programs. Depending on the configuration and type of computer system 500, system memory 510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 504. In some implementations, system memory 510 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the ROM. By way of example, and not limitation, system memory 510 also illustrates application programs 512, which may include client applications, Web browsers, mid-tier applications, relational database management systems (RDBMS), etc., program data 514, and an operating system 516.

By way of example, operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems. Operating system 516 may be part of (for example) a network layer and/or transport layer of the Open Systems Interconnection (OSI) model of computer system 500. Operating system 516 may perform part or all of one or more processes disclosed herein. For example, operating system 516 may control whether and/or when a file (e.g., a file stored in storage subsystem 518) is to be modified (e.g., metadata of the file is to be modified) to include a permission constraint as identified in an instruction in a communication (e.g., local input or a received message) from an authorized user.

Storage subsystem 518 may also provide a tangible computer-readable storage medium for storing the basic programming and data constructs that provide the functionality of some embodiments. Software (programs, code modules, instructions) that when executed by a processor provide the functionality described above may be stored in storage subsystem 518. These software modules or instructions may be executed by processing unit 504. Storage subsystem 518 may also provide a repository for storing data used in accordance with the present invention.

Storage subsystem 500 may also include a computer-readable storage media reader 520 that can further be connected to computer-readable storage media 522. Together and, optionally, in combination with system memory 510, computer-readable storage media 522 may comprehensively represent remote, local, fixed, and/or removable storage devices plus storage media for temporarily and/or more permanently containing, storing, transmitting, and retrieving computer-readable information.

Computer-readable storage media 522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 500.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500. By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed.

Figure 6:
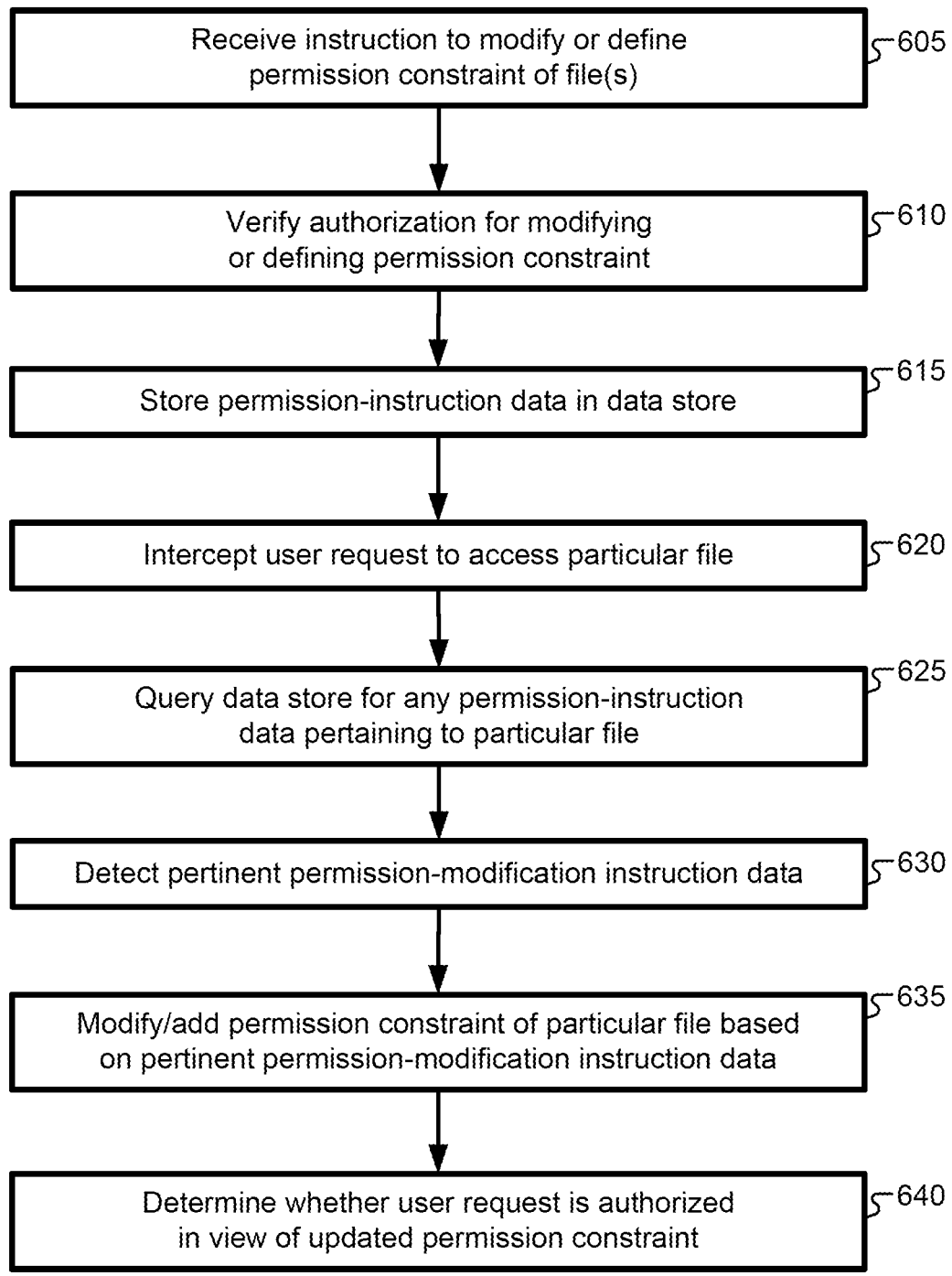
FIG. 6 illustrates a process for controlling and implementing permission constraints in accordance with some embodiments of the present invention.

FIG. 6 illustrates a process 600 for controlling and implementing permission constraints in accordance with some embodiments of the present invention. In some instances, each of one, more or all actions are performed by an operating system. The operating system may be one operating at a computing system that manages a file store with files for which permission constraints are being controlled and/or implemented. In some (but not all) instances, the computing system that manages the file store with files for which permission constraints are being controlled and/or implemented is the same computing system as one that receives an instruction that modifies or defines the permission constraint(s).

Process 600 begins at block 605 where an instruction to modify or define a permission constraint (e.g., add a permission constraint) of one or more files is received. In some instances, the instruction may specifically identify each of one or more files. In some instances, the instruction may identify one or more attributes, where the one or more files may then be identified as each file within one or more pre-identified data stores that have the attribute(s). The modification or definition of the permission constraint can include adding a permission constraint, changing a permission constraint (e.g., to change which types of file interactions are permissible, to change which types of file interactions are prohibited, to change for which users a white-listed action identified in the permission constraint applies, to change for which users a black-listed action identified in the permission constraint applies, to change a user attribute used in the permission constraint to indicate to which users a white-listed action applies, to change a user attribute used in the permission constraint to indicate to which users a black-listed action applies, etc.). The permission constraint may restrict or prevent a single specified user, multiple specified users, any user associated with one or more specified user attributes from interacting with the file(s) in a particular way (e.g., reading, writing, renaming, moving, compressing, adding links to, copying, attaching to an email, etc.).

At block 610, an authorization for modifying or defining the permission constraint is verified. The verification may include (for example) using a look-up table or rule to verify that a client account and/or client device from which the request was generated is authorized to impose the permission constraint (e.g., authorized to initiate: any type of permission constraints, a permission constraint of a particular type, a permission constraint that applies to one or more specific files corresponding to the instruction, a permission constraint that applies to any or all files corresponding to a file attribute identified in the instruction, etc.).

Upon the verification, at block 615, permission-instruction data is stored in a data store. The permission-instruction data may include the instruction to modify or define the permission constraint and/or a representation thereof. The data store may be local or remote to a device within which (for example) some or all actions in process 600 are being performed. The data store may be a different or same data store at which any or all files for which the permission constraint applies are stored.

A rule of the operating system may be defined to indicate that any of one, more or all types of user requests involving one or more files is to be intercepted. For example, a rule may indicate that all user requests pertaining to a file in a given file system (or part thereof), client account, of a particular time, one or more particular types of access requests (e.g., read, write, rename, move, etc.) and/or within a pre-defined date range is to be intercepted. As an additional or alternative example, a rule may indicate that all user requests originating from one or more pre-defined devices, any device having a pre-defined attribute (e.g., being on a particular network), any device on a pre-identified network, any device located in a pre-identified location region.

Intercepting the user request can include postponing determining whether the request will be declined or accepted and/or determining to what extent the request will be accepted. The determination may be postponed until it is determined whether any pending permission-constraint instruction pertains to any file being requested and—if so—until implementing the permission constraint is completed.

At block 625, in response to the interception, a data store that stores permission-instruction data is queried to determine whether any pending permission-instruction data pertains to the user request. Block 630 includes detecting that at least one set of permission-modification data pertains to the user request. In some instances, block 625 and/or block 630 may include determining that at least one file (e.g., an existing file or, in some instances, even also even possible file) pertaining to the permission-modification data relates to at least one file associated with the user request (e.g., identified in the user request via an identifier, file attribute, etc.). Block 630 may include detecting each of one or more particular files that both pertains to the permission-modification data and the user request.

At block 635, a permission constraint is modified or added for each of the one or more particular files detected at block 630 (e.g., as being a result of the query of block 625 and/or of pertaining to both the permission-modification data and the user request). The modification or addition of the permission constraint may be in accordance with the instruction received at block 605. The modification or addition may impose an access constraint disclosed herein. For example, the modification or addition may prevent or restrict write access, renaming access, link-addition access, read access, moving access, copying access and/or transmission access for all users, all users associated with one or more particular attributes, one or more specified users, etc. Modifying or adding the permission constraint may include modifying or changing metadata that indicates whether, when and/or how a user device (e.g., any user device, a user device associated with one or more specified attributes, or a specified user device) is authorized to interact with (e.g., in any manner, a specified white-list manner, or a specified black-list manner) the file(s). Modifying or adding the permission constraint can include modifying or changing an attribute of the file, where one or more other attributes of the file affect which attribute is changed or how the attribute is changed. For example, if a file is size 0, the file may gain a particular attribute, though if the file size is different, the file may gain a different attribute (e.g., identified based on the size). The permission constraint can be modified or added (for example) at least 1 day, at least 3 days, at least 1 week, at least 1 month, at least 3 months, at least 6 months, or at least 1 year after a time at which the permission-instruction data is stored. It will be appreciated that, in some instances another file identified in an authorized instruction to modify or define a permission constraint (e.g., specifically identified or having attributes that match those in the instruction) may end up never having such a permission constraint modified or defined if no user request to access that other file is received (e.g., generally or within a time period specified in the instruction).

At block 640, the new or modified permission constraint is used to determine whether and/or how the request is to be granted. For example, block 640 may include a binary decision as to whether to comply with or decline the request. As another example, block 640 may include determining to with what degree the request can be complied. To illustrate, if a request is to open a particular file and a permission constraint indicates that the particular file is not to be modified, block 640 may include granting read access but not write access. While not shown, in some instances, the user request is processed in accordance with the determination of block 640. For example, the request may be processed to the fullest degree permitted based on the new or modified permission constraint and/or a response may be provided indicating whether the request will be or has been processed based on the new or modified permission constraint. Exemplary request processing results may include (for example) availing read-only access to a file, availing read and write access of a file while preventing renaming of the file, availing read and write access of a file while preventing moving of the file, availing read and write access of a file while preventing deleting of the file, etc.

Based on the disclosure and teachings provided herein, a person of ordinary skill in the art will appreciate other ways and/or methods to implement the various embodiments.

In the present description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The present description provides exemplary embodiments only, and is not intended to limit the scope, applicability, or configuration of the disclosure. Rather, the present description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the present description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the present specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method comprising:
   receiving, using a computer system, an instruction to define or modify a permission constraint corresponding to one or more files, wherein the one or more files includes a particular file;
   storing, in a data store, a permission-instruction data set representing the permission constraint;
   subsequent to storing the permission-instruction data set, intercepting a user request to access the particular file;
   querying the data store to determine whether any pending permission-instruction data set corresponds to the particular file;
   determining, in response to the querying, that the permission-instruction data set corresponds to the particular file;
   modifying or adding the permission constraint of the particular file based on the permission-instruction data set;
   determining, based on the modified or added permission constraint, whether and or an extent to which the user request is authorized; and
   outputting a response to the user request based on the determination as to whether and or an extent to which the user request is authorized.

2. The method of claim 1, wherein an operating system performs the intercepting the user request, the querying the data store, and the determining that the permission-instruction data set corresponds to the particular file.

3. The method of claim 1, wherein modifying or adding the permission constraint includes adding a permission constraint that disallows modification to content of the particular file and that disallows deleting the particular file, and wherein the response to the user request includes a read-only version of the particular file.

4. The method of claim 1, wherein the permission-instruction data set identifies a particular period of time during which the permission constraint is to be applied, and wherein the method further comprises:
   upon determining that the permission-instruction data set corresponds to the particular file, determining that a current time is within the particular period of time.

5. The method of claim 1, wherein the user request was received at the computer system from a user device, wherein the computer system at least partly controls a set of files that are remote from the user device, and wherein the set of files includes the particular file.

6. The method of claim 1, wherein the modifying or adding the permission constraint occurs at least two weeks after the storing the permission-instruction data set.

7. The method of claim 1, wherein the instruction identifies one or more file attributes and indicates that permission constraint is to apply to any file, within a set of files, that has the one or more file attributes, and wherein determining that the permission-instruction data set corresponds to the particular file includes determining that the particular file has the one or more file attributes.

8. A system comprising:
one or more data processors; and
a non-transitory computer readable storage medium containing instructions which, when executed on the one or more data processors, cause the one or more data processors to perform a set of actions including:
receiving an instruction to define or modify a permission constraint corresponding to one or more files, wherein the one or more files includes a particular file;
storing, in a data store, a permission-instruction data set representing the permission constraint;
subsequent to storing the permission-instruction data set, intercepting a user request to access the particular file;
querying the data store to determine whether any pending permission-instruction data set corresponds to the particular file;
determining, in response to the querying, that the permission-instruction data set corresponds to the particular file;
modifying or adding a permission constraint of the particular file based on the permission-instruction data set;
determining, based on the modified or added permission constraint, whether and or an extent to which the user request is authorized; and
outputting a response to the user request based on the determination as to whether and or an extent to which the user request is authorized.

9. The system of claim 8, wherein an operating system performs the intercepting the user request, the querying the data store, and the determining that the permission-instruction data set corresponds to the particular file.

10. The system of claim 8, wherein modifying or adding the permission constraint includes adding a permission constraint that disallows modification to content of the particular file and that disallows deleting the particular file, and wherein the response to the user request includes a read-only version of the particular file.

11. The system of claim 8, wherein the permission-instruction data set identifies a particular period of time during which the permission constraint is to be applied, and wherein the set of actions further comprises:
upon determining that the permission-instruction data set corresponds to the particular file, determining that a current time is within the particular period of time.

12. The system of claim 8, wherein the user request was received at the system from a user device, wherein the system at least partly controls a set of files that are remote from the user device, and wherein the set of files includes the particular file.

13. The system of claim 8, wherein the modifying or adding the permission constraint occurs at least two weeks after the storing the permission-instruction data set.

14. The system of claim 8, wherein the instruction identifies one or more file attributes and indicates that permission constraint is to apply to any file, within a set of files, that has the one or more file attributes, and wherein determining that the permission-instruction data set corresponds to the particular file includes determining that the particular file has the one or more file attributes.

15. A computer-program product tangibly embodied in a non-transitory machine-readable storage medium, including instructions configured to cause one or more data processors to perform a set of actions including:
receiving, using a computer system, an instruction to define or modify a permission constraint corresponding to one or more files, wherein the one or more files includes a particular file;
storing, in a data store, a permission-instruction data set representing the permission constraint;
subsequent to storing the permission-instruction data set, intercepting a user request to access the particular file;
querying the data store to determine whether any pending permission-instruction data set corresponds to the particular file;
determining, in response to the querying, that the permission-instruction data set corresponds to the particular file;
modifying or adding a permission constraint of the particular file based on the permission-instruction data set;
determining, based on the modified or added permission constraint, whether and or an extent to which the user request is authorized; and
outputting a response to the user request based on the determination as to whether and or an extent to which the user request is authorized.

16. The computer-program product of claim 15, wherein an operating system performs the intercepting the user request, the querying the data store, and the determining that the permission-instruction data set corresponds to the particular file.

17. The computer-program product of claim 15, wherein modifying or adding the permission constraint includes adding a permission constraint that disallows modification to content of the particular file and that disallows deleting the particular file, and wherein the response to the user request includes a read-only version of the particular file.

18. The computer-program product of claim 15, wherein the permission-instruction data set identifies a particular period of time during which the permission constraint is to be applied, and wherein the set of actions further comprises:
upon determining that the permission-instruction data set corresponds to the particular file, determining that a current time is within the particular period of time.

19. The computer-program product of claim 15, wherein the user request was received at the computer system from a user device, wherein the computer system at least partly controls a set of files that are remote from the user device, and wherein the set of files includes the particular file.

20. The computer-program product of claim 15, wherein the modifying or adding the permission constraint occurs at least two weeks after the storing the permission-instruction data.

* * * * *

UNITED STATES PATENT AND TRADEMARK OFFICE
CERTIFICATE OF CORRECTION

PATENT NO. : 12,067,132 B2  
APPLICATION NO. : 17/561469  
DATED : August 20, 2024  
INVENTOR(S) : Harres et al.

Page 1 of 1

It is certified that error appears in the above-identified patent and that said Letters Patent is hereby corrected as shown below:

In the Drawings

On sheet 2 of 6, in FIG. 2, under reference numeral 226-1, Line 1, delete "Arrary)" and insert -- Array) --, therefor.

On sheet 2 of 6, in FIG. 2, under reference numeral 226-2, Line 1, delete "Arrary)" and insert -- Array) --, therefor.

In the Specification

In Column 15, Line 60, delete "and.or" and insert -- and/or --, therefor.

In Column 18, Line 26, delete "laaS" and insert -- IaaS --, therefor.

In Column 27, Line 66, delete "RAMS," and insert -- RAMs, --, therefor.

In the Claims

In Column 28, Line 36, in Claim 1, delete "and or" and insert -- and or or --, therefor.

In Column 28, Line 39, in Claim 1, delete "and or" and insert -- and or or --, therefor.

In Column 29, Line 28, in Claim 8, delete "and or" and insert -- and or or --, therefor.

In Column 29, Line 31, in Claim 8, delete "and or" and insert -- and or or --, therefor.

In Column 30, Line 27, in Claim 15, delete "and or" and insert -- and or or --, therefor.

In Column 30, Line 30, in Claim 15, delete "and or" and insert -- and or or --, therefor.

Signed and Sealed this  
Tenth Day of December, 2024

Katherine Kelly Vidal  
*Director of the United States Patent and Trademark Office*